United States Patent [19]
Chang

[11] Patent Number: 5,941,153
[45] Date of Patent: Aug. 24, 1999

[54] QUICK RELEASE SAW BLADE CHUCK FOR A SCROLL SAW

[75] Inventor: Chiu-Tsun Chang, Taichung, Taiwan

[73] Assignee: P & F Brothers Industrial Corporation, Taiwan

[21] Appl. No.: 08/966,784

[22] Filed: Nov. 10, 1997

[51] Int. Cl.[6] .................................................. B27B 19/02
[52] U.S. Cl. ............................ 83/662; 83/697; 83/698.71
[58] Field of Search ................................ 83/697, 698.71, 83/699.21, 699.31, 699.51, 786, 662, 783, 784; 30/392; 403/17, 321, 322, 323, 327, 330

[56] References Cited

U.S. PATENT DOCUMENTS

| | | | |
|---|---|---|---|
| 72,498 | 9/1867 | Inman | 83/662 |
| 570,094 | 9/1896 | Heyn | 83/699.21 |
| 1,799,108 | 3/1931 | Lof | 83/699.21 |
| 2,499,712 | 3/1950 | Armstrong | 403/321 |
| 2,519,214 | 8/1950 | Angelotti | 83/699.21 |
| 2,661,970 | 12/1953 | Petersen | 403/321 |
| 4,106,181 | 8/1978 | Mattchen | 83/699.21 |
| 4,805,505 | 2/1989 | Cantlin | 83/471.2 |
| 5,088,363 | 2/1992 | Rice et al. | 83/662 |
| 5,351,590 | 10/1994 | Everts et al. | 83/699.21 |
| 5,363,733 | 11/1994 | Baird et al. | 83/786 |
| 5,409,321 | 4/1995 | Chen | 403/330 |

*Primary Examiner*—Rinaldi I. Rada
*Assistant Examiner*—Gyounghyun Bae

[57] ABSTRACT

A quick release saw blade chuck includes a mounting block, a clamping block pivotally connected to the mounting block, a bolt member extending through a bore in the clamping block, a threaded unit engaging threadably an externally threaded end portion of the bolt member, a rotary lever having a pivot end portion which is pivotally connected to a pivot end portion of the bolt member by a small pivot pin, and a spring for biasing an engaging face of the clamping block to press against a positioning face of the rotary lever. A saw blade is clamped between a pressing face of the clamping block and a bearing face of the mounting block. The rotary lever can be rotated about the small pivot pin so as to remove the positioning face of the rotary lever from the engaging face of the clamping block and so as to engage a camming face of the rotary lever with the bearing face of the mounting block, thereby permitting the spring to bias the pressing face of the clamping block to separate from the saw blade. At this time, the saw blade can be replaced with a new one. Then, the rotary lever is rotated back to the original position so that the clamping block presses the new saw blade against the mounting block.

3 Claims, 7 Drawing Sheets

QUICK RELEASE SAW BLADE CHUCK FOR A SCROLL SAW

BACKGROUND OF THE INVENTION

1. Field of the Invention

This invention relates to a scroll saw, more particularly to a quick release saw blade chuck which can lock releaseably one end of a saw blade on a driving arm of a scroll saw.

2. Description of the Related Art

Referring to FIG. 1, a conventional scroll saw (A) is provided with two blade fastening devices (B) for securing removably and respectively opposite end portions of a saw blade (C) to distal ends of upper and lower drive arms (A1, A2) of the scroll saw (A).

Referring to FIG. 2, the conventional blade fastening device (B) is shown to comprise a mounting block (B1), a clamping block (B2) and an externally threaded fastener (B3). The mounting block (B1) is adapted to be mounted securely on the distal end of one of the drive arms of a scroll saw. One end portion of a saw blade (C) is sandwiched between a pressing face of the clamping block (B2) and a bearing face of the mounting block (B1). The fastener (B3) extends through a through-hole (B12) in the mounting block (B1) and engages a threaded hole (B22) in the clamping block (B2), thereby retaining the end portion of the saw blade (C) between the mounting and clamping blocks (B1, B2). When it is desired to effect replacement of the saw blade (C), it is inconvenient and time-consuming to remove the fastener (B3) from the threaded hole (B22) of the clamping block (B2) since the removal operation requires the use of a hand tool (not shown).

SUMMARY OF THE INVENTION

The object of this invention is to provide a scroll saw with a quick release saw blade chuck which can be operated easily and quickly to release a saw blade therefrom for replacement of the saw blade.

According to this invention, a quick release saw blade chuck includes a mounting block, a clamping block pivotally connected to the mounting block, a bolt member extending through a bore in the clamping block, a threaded unit engaging threadably an externally threaded end portion of the bolt member, a rotary lever having a pivot end portion which is pivotally connected to a pivot end portion of the bolt member by a small pivot pin, and a spring for biasing an engaging face of the clamping block to press against a positioning face of the rotary lever. A saw blade is clamped between a pressing face of the clamping block and a bearing face of the mounting block. The rotary lever can be rotated about the small pivot pin so as to remove the positioning face of the rotary lever from the engaging face of the clamping block and so as to engage a camming face of the rotary lever with the bearing face of the mounting block, thereby permitting the spring to bias the pressing face of the clamping block to separate from the saw blade. At this time, the saw blade can be replaced with a new one. Then, the rotary lever is rotated back to the original position so that the clamping block presses the new saw blade against the mounting block. As a consequence, no tool is needed to replace the saw blade held on the chuck of this invention, thereby resulting in a convenient and simple operation when replacing a saw blade.

BRIEF DESCRIPTION OF THE DRAWINGS

Other features and advantages of this invention will become apparent in the following detailed description of the preferred embodiment with reference to the accompanying drawings in which.

DETAILED DESCRIPTION OF THE PREFERRED EMBODIMENT

Figure 1:
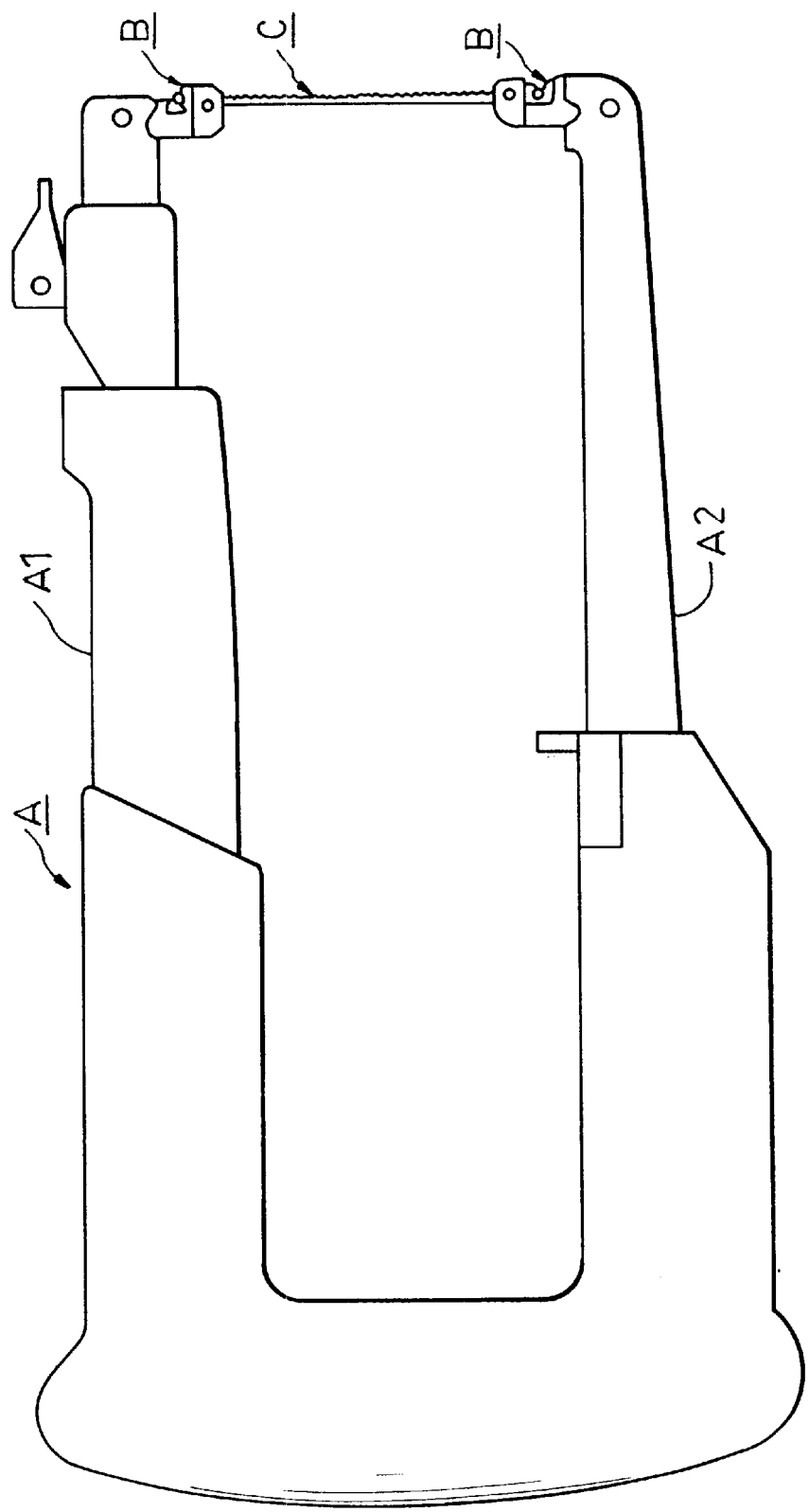
FIG. 1 is a schematic view illustrating a scroll saw with a pair of conventional blade fastening devices for securing removably opposite end portions of a saw blade to upper and lower driving arms of the scroll saw.
Figure 2:
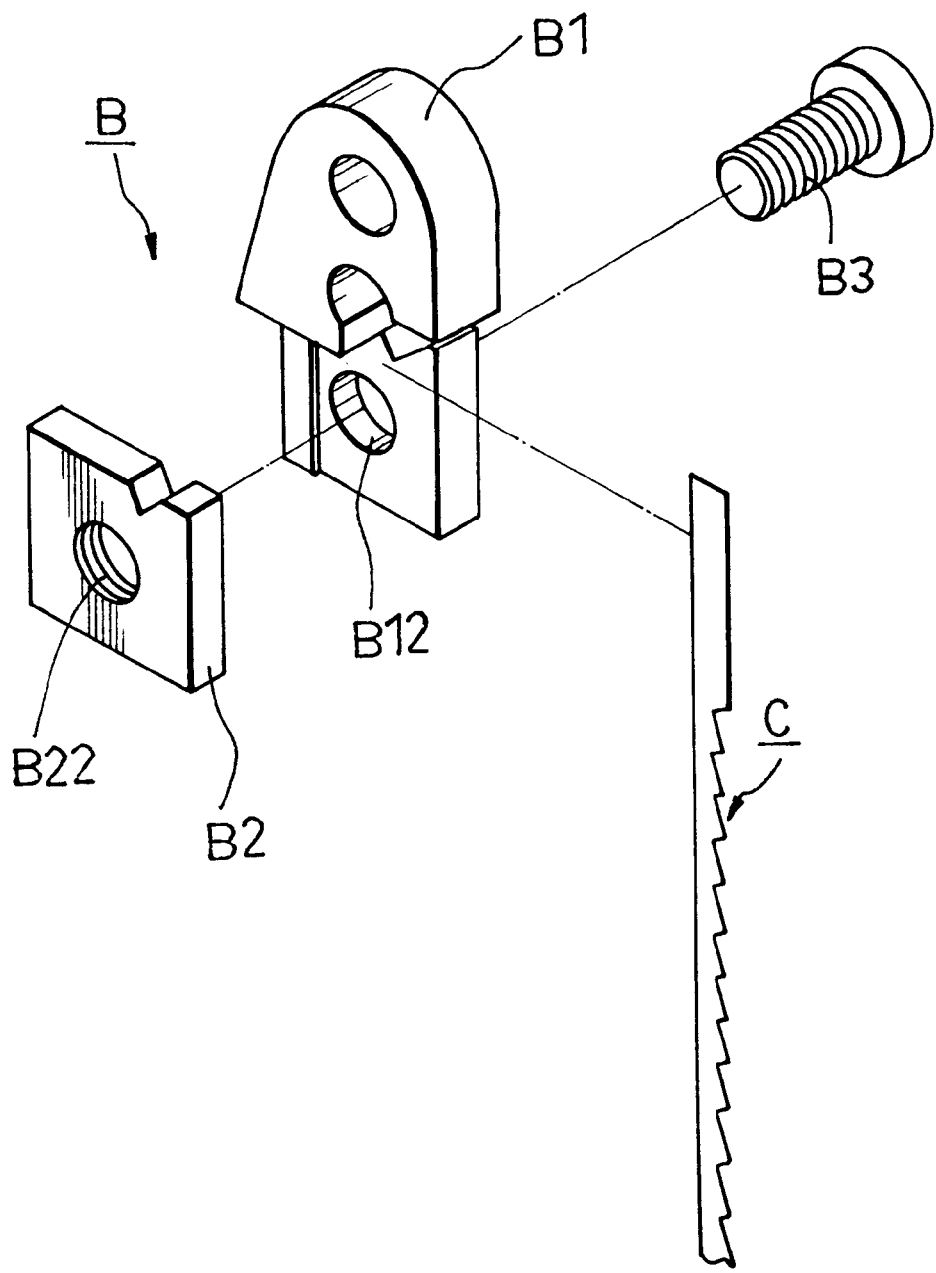
FIG. 2 is an exploded perspective view of the conventional blade fastening device.
Figure 3:
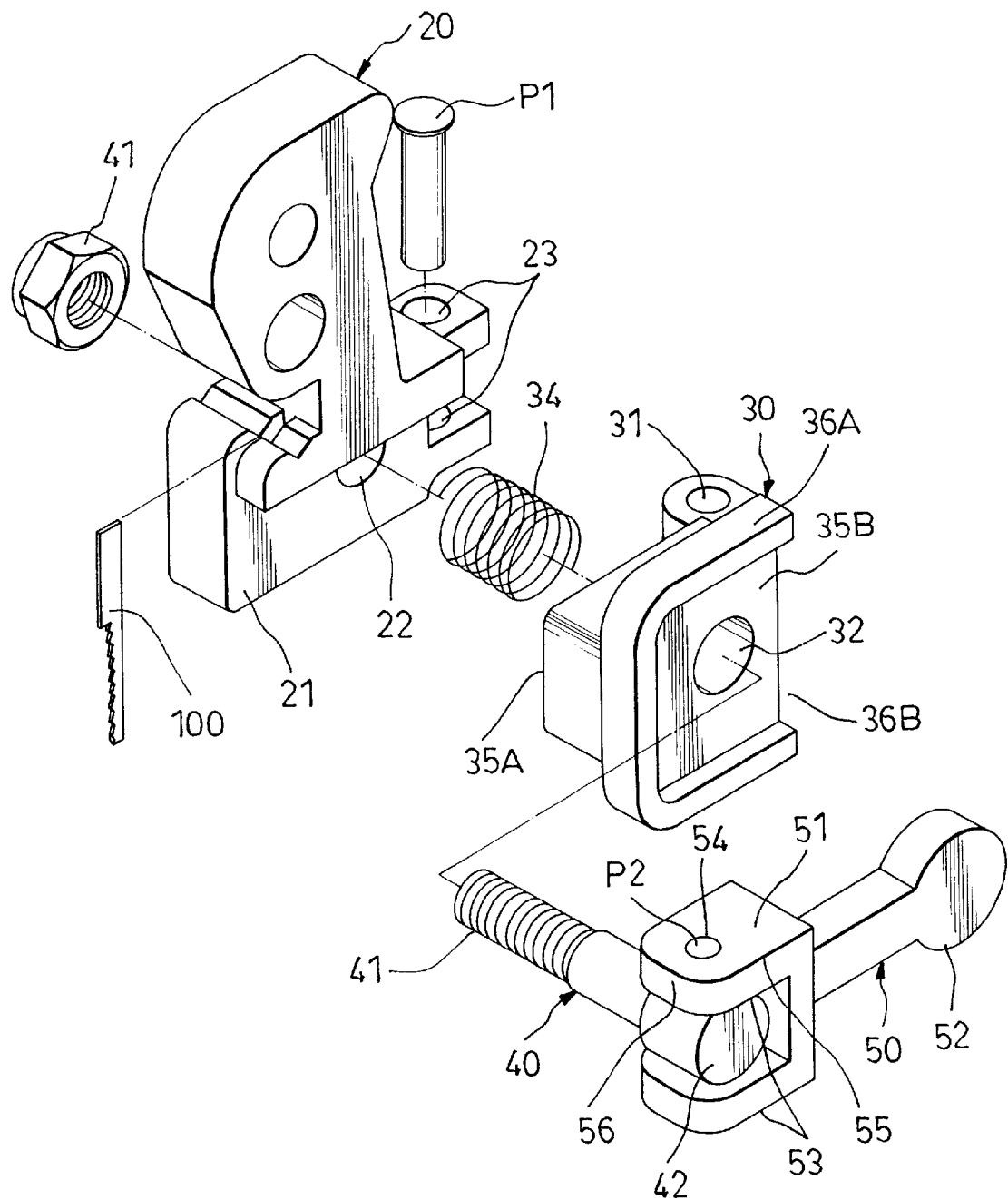
FIG. 3 is an exploded perspective view of the preferred embodiment of a quick release saw blade chuck according to this invention.
Figure 4:
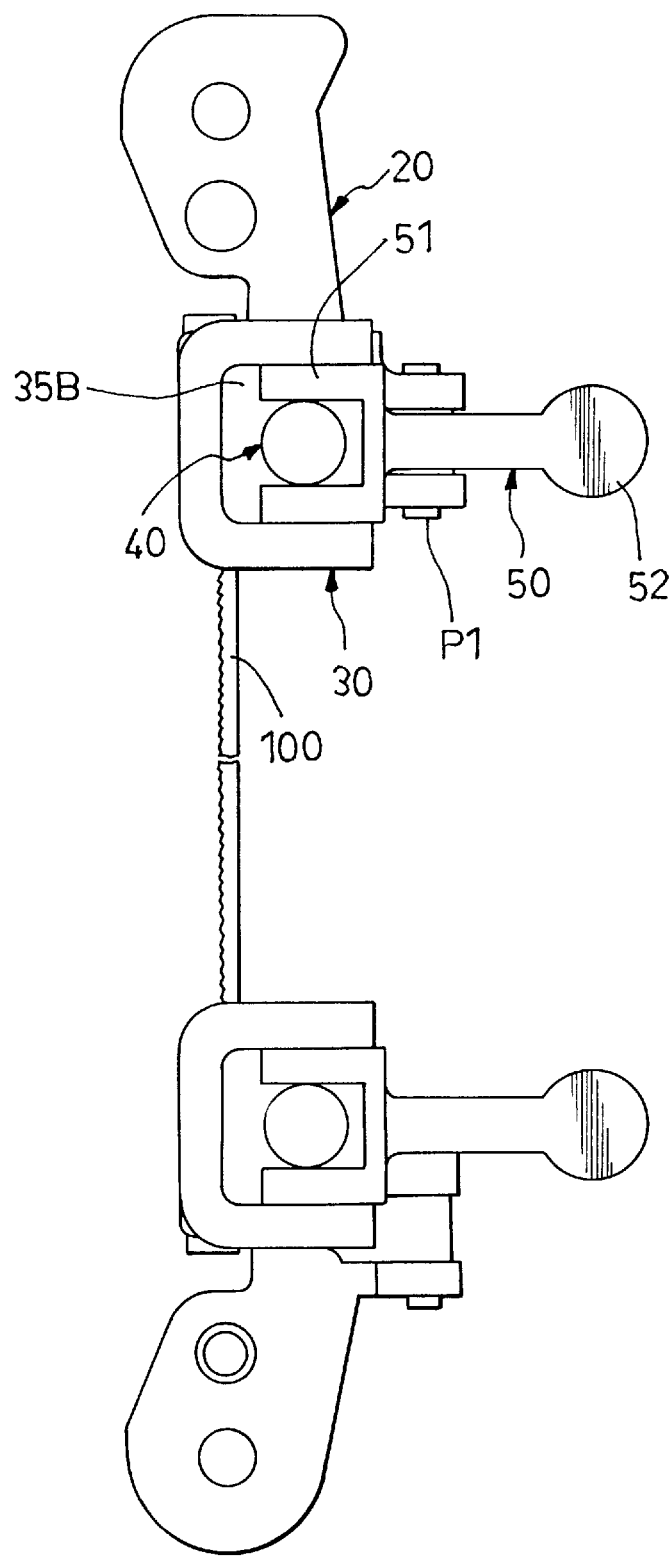
FIG. 4 is a schematic side view illustrating the preferred embodiment when installed on each of two opposite end portions of a saw blade.

Referring to FIGS. 3 and 4, a preferred embodiment of a quick release saw blade chuck of this invention is installed on each of two opposite end portions of a saw blade 100 and is shown to include a mounting seat 20, a clamping block 30, a coiled compression spring 34, a threaded unit or nut 41, a bolt member 40 and a rotary lever 50.

The mounting block 20 is adapted to be mounted fixedly on the distal end of one of the driving arms of a scroll saw (not shown), and has a generally planar bearing face 21, and a bore 22 which is formed therethrough.

A large pivot pin (P1) extends through a pivot hole unit 23 in the mounting block 20 and a pivot hole unit 31 in the clamping block 30 so that the clamping block 30 is mounted rotatably on the mounting block 20.

The clamping block 30 has a bore 32 which is formed therethrough and which has an enlarged end portion 33 in which the spring 34 is received. A generally planar pressing face 35A and a generally planar engaging face 35B are formed on two opposite sides of the clamping block 30. A U-shaped flange 36A projects from a periphery of the engaging face 35B and defines a gap 36B.

The bolt member 40 extends through the bores 22, 32 of the mounting block 20 and the clamping block 30, and has an externally threaded end portion 41 for engaging the nut 41, and a pivot end portion 42 extending from the clamping block 30. The member 40 is generally perpendicular to the pin (P1).

The rotary lever 50 has a forked pivot end portion 51 and an actuating free end portion 52. The pivot end portion 51 of the rotary lever 50 has two generally rectangular prong plates 53, each of which has a pivot hole 54 for extension of a small pivot pin (P2), a generally planar positioning peripheral surface 55 spaced apart from the pivot hole 54 at a distance (D1) (see FIG. 5), and a generally planar camming peripheral surface 56 which is spaced apart from the pivot hole 54 at a distance (D2) (see FIG. 5), which is smaller than the distance (D1). The pivot end portion 42 of the bolt member 40 extends between the prong plates 53 of the rotary lever 50. The positioning peripheral surfaces 55 of the prong plates 53 constitute a positioning face unit. The camming peripheral surfaces 56 of the prong plates 53 constitute a camming face unit. The pin (P2) extends diametrically of the member 40.

Figure 5:
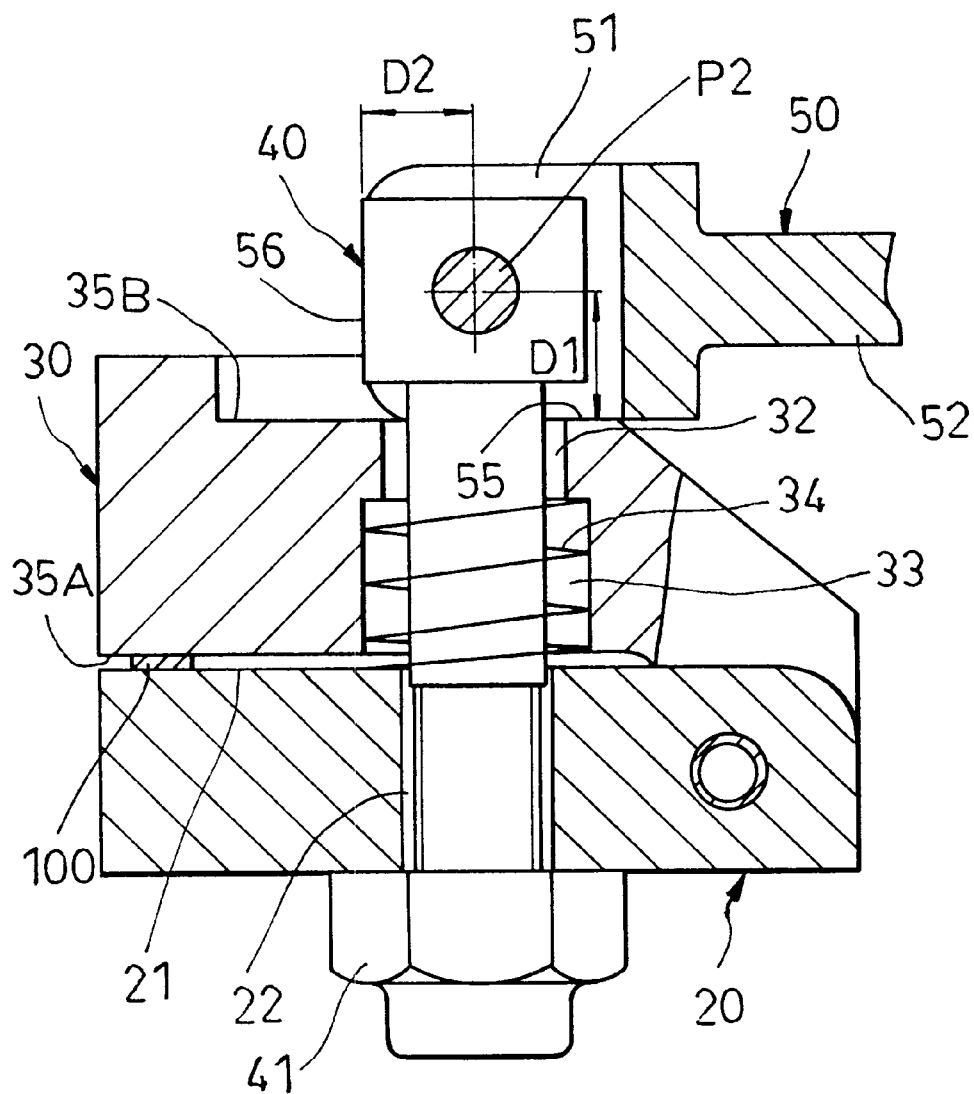
FIG. 5 is a schematic sectional view illustrating how a saw blade is held between a mounting block and a clamping block of the preferred embodiment.

As shown in FIG. 5, when the positioning peripheral surfaces 55 of the rotary lever 50 are biased by the spring 34 to engage the engaging face 35B of the clamping block 30, the saw blade 100 is clamped between the bearing face 21 of the mounting block 20 and the pressing face 35A of the clamping block 30.

Figure 6:
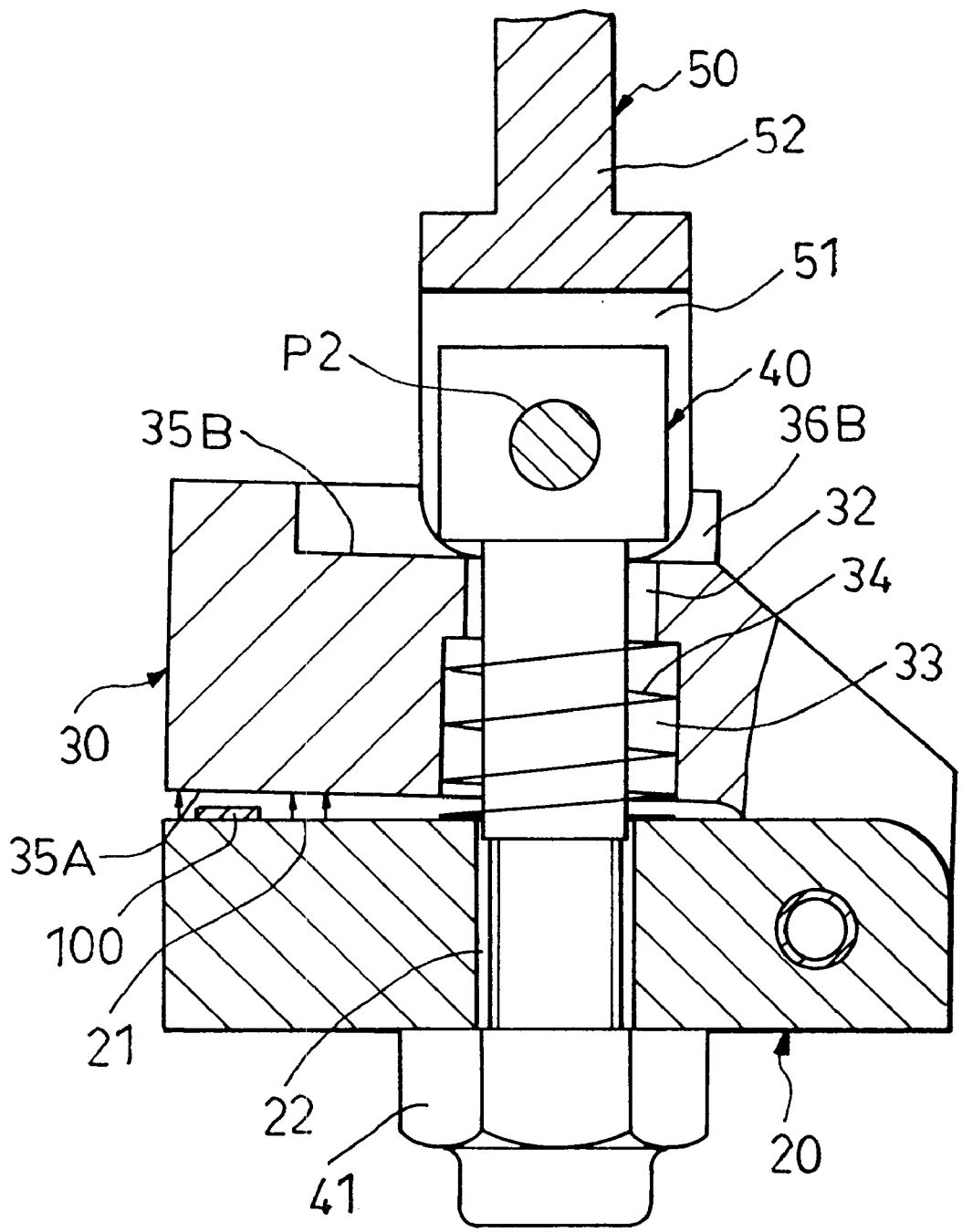
FIG. 6 is a schematic sectional view illustrating how a saw blade is released from the blade chuck of the preferred embodiment.

The rotary lever 50 can be rotated about the small pivot pin (P2) to the position shown in FIG. 6, so as to remove the positioning peripheral surfaces 55 of the rotary lever 50 from the engaging face 35B of the clamping block 30 and so as to engage the camming peripheral surfaces 56 of the rotary lever 50 with the engaging surface 35B of the clamping block 30, thereby removing the pressing face 35A of the clamping block 30 from the saw blade 100. After the saw blade 100 is replaced with a new one, the rotary lever 50 can be rotated back to the position shown in FIG. 5, in which the new saw blade can be held between the mounting block 20 and the clamping block 30.

Figure 7:
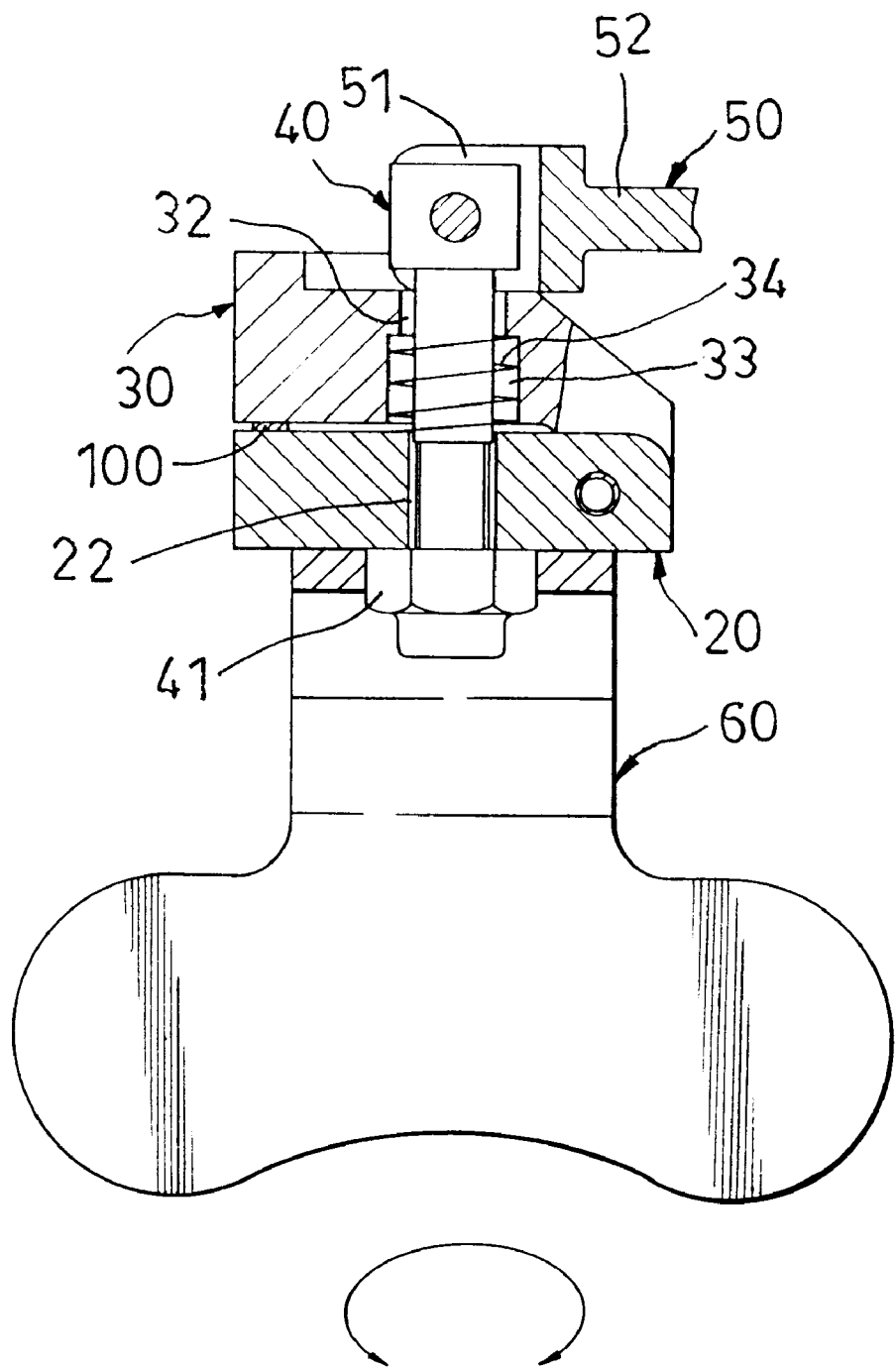
FIG. 7 is a schematic sectional view illustrating how the preferred embodiment is adjusted to hold a saw blade having a different thickness thereon.

Referring to FIG. 7, when the new saw blade 100' has a thickness different from that of the saw blade 100, the nut 41 can be fixed relative to the mounting block 20 by means of a spanner 60, and the rotary lever 50 is rotated about the bolt member 40, thereby moving the clamping block 30 toward or away from the mounting block 20.

With this invention thus explained, it is apparent that numerous modifications and variations can be made without departing from the spirit and scope of this invention. It is therefore intended that this invention be limited only as indicated in the appended claims.

I claim:

1. A saw blade chuck for locking releasably one end portion of a saw blade to a driving arm of a scroll saw, said saw blade chuck comprising:

a mounting block adapted to be fixedly mounted on the driving arm having a first bore formed therethrough, and a generally planar bearing face;

a clamping block connected pivotally to said mounting block having a second bore formed therethrough, a generally planar pressing face and a generally planar engaging face;

a rotary lever having a pivot end portion and a hole formed therethrough, said rotary lever being interconnected to said clamping block, said clamping block being located between said mounting block and said rotary lever, said pivot end portion of said rotary lever having a generally planar positioning peripheral surface and a generally planar camming peripheral surface, said positioning peripheral surface being spaced apart from said hole at a distance that is larger than the distance between the camming peripheral surface and said hole; and a spring located between said mounting block and said clamping block to bias said clamping block away from said mounting block and to press said engaging face of said clamping block against said positioning peripheral surface of said rotary lever, thereby clamping the saw blade between said bearing face of said mounting block and said pressing face of said clamping block.

2. A saw blade chuck for locking releasably one end portion of a saw blade to a driving arm of a scroll saw as recited in claim 1, further comprising:

a pivot pin, said pivot pin extending through said hole of said rotary lever;

wherein said rotary lever being rotatable about said pivot pin to remove said positioning peripheral surface of said rotary lever from said engaging face of said clamping block and to align said camming peripheral surface of said rotary lever with said engaging face of said clamping block so that said engaging face of said clamping block is biased by said spring against said camming peripheral surface of said rotary lever, thereby releasing the saw blade from said clamping block and said mounting block and positioning said rotary lever relative to said clamping block.

3. A saw blade chuck for locking releasably one end portion of a saw blade to a driving arm of a scroll saw as recited in claim 2, further comprising:

a bolt member extending said first and said second bore and having a pivot end portion and an externally threaded end portion; and a nut engaging said threaded end portion of said bolt member;

wherein said rotary lever being pivotally connected to said pivot end portion of said rotary bolt member by said pivot pin; and wherein said spring is a coiled spring.

* * * * *